May 19, 1953  H. A. REINHARDT  2,639,250
NONWOVEN SOFT-SURFACE FLOOR COVERING
AND METHOD OF PRODUCING THE SAME

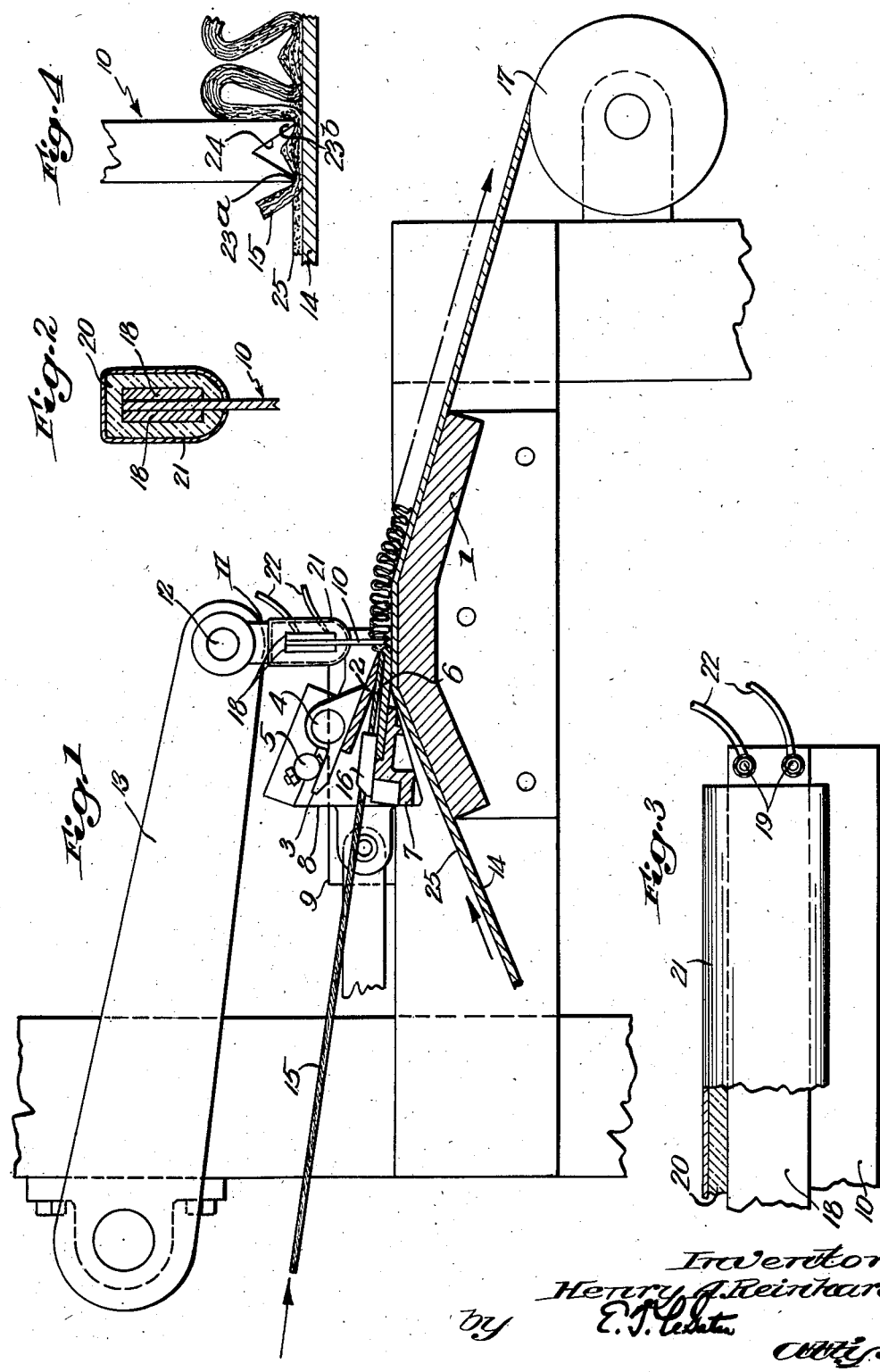

Filed Nov. 7, 1951  3 Sheets-Sheet 2

Inventor
Henry A. Reinhardt
by
atty.

May 19, 1953 H. A. REINHARDT 2,639,250
NONWOVEN SOFT-SURFACE FLOOR COVERING
AND METHOD OF PRODUCING THE SAME
Filed Nov. 7, 1951 3 Sheets-Sheet 3

Inventor
Henry A. Reinhardt
by
Attys.

Patented May 19, 1953

2,639,250

UNITED STATES PATENT OFFICE 2,639,250

NONWOVEN SOFT-SURFACE FLOOR COVERING AND METHOD OF PRODUCING THE SAME

Henry A. Reinhardt, Longmeadow, Mass., assignor to Bigelow-Sanford Carpet Company, Inc., Thompsonville, Conn., a corporation of Delaware Application November 7, 1951, Serial No. 255,232

16 Claims. (Cl. 154—78)

This invention relates to a method of producing non-woven soft-surface floor coverings and to the product thereof.

The invention provides a process for producing a floor covering in which a soft-surface material is securely adhered in rows to a backing sheet by a thermoresponsive adhesive.

My novel product comprises soft-surface material in the form of upstanding pile-like rows extending across the width of a backing sheet. A feature of the product is that the soft-surface material is adhered to the backing sheet by being embedded, between said upstanding rows, in an adhesive along closely adjacent parallel lines, the adhesive being thicker between said lines than at said lines so that it is in the form of ridges, between said lines, to and in which the soft-surface material is secured. This thicker mass of adhesive between said lines assures a firm bond of the soft-surface material to the backing sheet. The adhesive material may be and preferably is one or more of the adhesive materials referred to below as suitable for use in my process, or it may be any other suitable adhesive material, suitably flexible when set.

According to my process, soft-surface material is pressed along lines extending across the width of a backing sheet to form a bight and apply the bight directly to and press it against and into a thermoresponsive adhesive while the adhesive is in soft condition so that the soft-surface material is well embedded therein. The thermoresponsive adhesive is locally heated, i. e., heated only in the vicinity of said line, simultaneously with the pressing operation, and is then hardened, either by the heat or by subsequent cooling, and thereby creates on the lines along which the soft-surface material is pressed, a firm bond between the soft-surface material and the backing sheet.

The soft-surface material may be a sheet of felt or preferably a sheet of slivers or of pile yarns, as of wool. The backing sheet may be of any suitable flexible material, woven or unwoven, preferably burlap or paper.

The thermoresponsive adhesive for use in my process may be a thermoplastic adhesive, which is initially solid but is softened to receive the soft-surface material by the heat, such as a compound of polyvinyl acetate. Other satisfactory and suitable thermoplastic adhesives may be prepared by utilizing any of the following thermoplastic resin bases, polyvinyl acetate, polyvinyl chloride, polyvinyl acetals, polyvinylidene chloride, polyacrylates, or the copolymers of those resins, compounded by well known methods. Or the adhesive may be a thermosetting resin type of adhesive provided this is adequately plasticized or provided the end use to which my product is to be put does not demand that the product be highly flexible. Typical of the thermosetting resins which I have found effective are the urea-formaldehyde resin adhesives, the phenol-formaldehyde resin adhesives and similar adhesives based on thermosetting resins. Adhesives of this latter class are provided on the backing sheet with the resin in the A or B stage, from which state they are advanced by the application of heat to the insoluble, infusible C stage. I also may include the so-called thermoplastic-thermosetting resin adhesives, such as those formed from the reaction product of polyvinyl butyral with melamine formaldehyde, which may be solid initially but capable of being first softened and then solidified and set by the heat. While it is preferred, as indicated above, that the adhesive be liquid or semi-liquid as a paste, it is possible to use the adhesive in the form of a thin layer of powder suitably bonded to the backing sheet.

In addition, the adhesive may be a plastisol paste type of adhesive, comprising a polyvinyl resin and a plasticizer as disclosed in the copending United States patent application of Charles R. Johnson, Serial No. 242,515 filed August 18, 1951.

The thickness of the coat of adhesive on the backing fabric may range from .005" to .040" as best suited to insure a firm bond with the surface material.

Other objects and features of this invention will appear from the following description in conjunction with the accompanying drawings and will be more particularly pointed out in the appended claims.

The novel product of my invention and means by which the process of my invention may be practiced are illustrated in the accompanying drawings, in which:

Fig. 1 is a side view in cross-section of an apparatus which may be used to produce the desired floor covering;

Fig. 2 is a side view in cross-section of a means to heat the blade of Fig. 1;

Fig. 3 is a front view partly in elevation and partly in cross-section of the same means;

Fig. 4 is an enlarged diagrammatic side view in cross-section of the tip of the blade illustrating its mode of operation;

Figure 5:
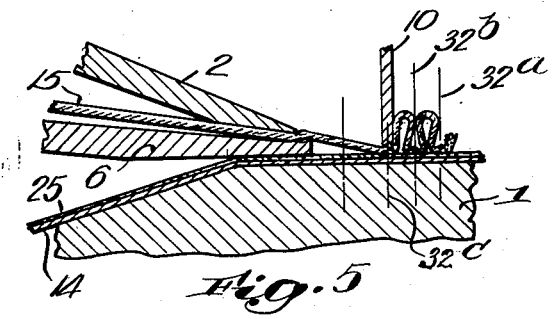
Figs. 5, 6, 7 and 8 are diagrammatic side views in cross-section of a cycle of one form of the process.

The mechanism illustrated in Fig. 1 comprises the following related parts; backing sheet support 1 mounted on machine framework; upper soft-surface material gripper 2 with carrier 3 pivotally mounted on shaft 4 and controlled by a cam on shaft 5; lower soft-surface material gripper 6 mounted on support 7; the complete gripper assembly mounted on end bracket 8 slidably mounted in grooved bracket 9; heated blade 10 carried in arms 11 mounted on shaft 12 pivoted in the end of arm 13; backing sheet 14 with thermoresponsive adhesive coating 25; sheet of soft-surface material 15; soft-surface material guide 16 fastened to support 7; and spike roll 17. The movable parts in conjunction with each other and the stationary parts are so controlled and operated as to direction, speed, amount of motion, and timing by suitable related mechanism that they produce the desired cycles and results hereinafter described.

The blade 10, Fig. 2, is heated by the heating elements 18 secured to its upper portion by nuts and bolts 19. These parts, except the downwardly protruding edge of the blade, are insulated by asbestos packing 20 and enclosed in a sheet metal cover 21, through the bottom of which the blade extends.

The heating elements 18, Fig. 3, extend laterally beyond the cover 21 where the nuts and bolts 19 serve as terminals for wires 22 leading from a source of supply of electrical current which heats the elements and the blade.

The temperature of the blade may range from 375° F. to 700° F., depending upon the type of adhesive. The dwell, or length of time during which the heated blade is allowed to press the soft-surface material into the adhesive, is of such duration that the heat of the blade does not char or otherwise injure the soft-surface material. I have found that a temperature of 550° F. to 575° F. and a dwell of five to two seconds' duration are preferable and most satisfactory to activate the thermoresponsive adhesive sufficiently, without deleteriously affecting the soft-surface material, and to cause that material to adhere to the backing fabric.

The blade 10 may be formed of a single piece of metal machined and ground to form opposite edges 23a and 23b respectively, with a groove 24 centrally located between them. The blade, however, may consist of two separate parts, each having an oppositely ground edge to provide the groove and edges described. The latter are not sufficiently sharp to cut or otherwise damage the soft-surface material 15. Groove 24 by proper machining and grinding may be formed into any desired shape such as a semi-circle or a Gothic arch. When the heated blade presses the soft-surface material into the soft adhesive 25, a pocket is created within the groove between its edges, Fig. 4, in which some of the adhesive is retained and is not pressed out sidewise, so that a substantial amount thereof remains beneath the blade, thereby firmly embedding the soft-surface material in the adhesive along closely-adjacent parallel lines beneath the edges of the blade and forming the adhesive material into ridges, between these lines, to and in which the soft-surface material is secured, thereby effecting a strong bond between the soft-surface material and the backing sheet.

A process or cycle performed with the aid of this apparatus is illustrated in Figs. 5, 6, 7, and 8.

The heated blade 10, Fig. 5, presses the soft-surface material 15 along line 32c from one side of said material to the other against the adhesive 25 on the upper surface of the backing fabric 14 on the cloth support 1. The adhesive along line 32c is rendered soft and tacky by the heat of the blade, if it is not already soft. The adhesive along lines 32a and 32b has already set to form a portion of the completed fabric. The lower edge of the heated blade has been carried forward by the advance of the completed fabric thereby tilting the blade slightly to the right. Upper gripper 2 and lower gripper 6 are in retracted position and gripping the soft-surface material 15.

Figure 6:
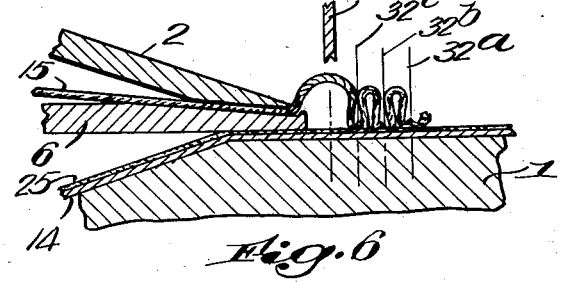

As grippers 2 and 6 advance to form slack in the soft-surface material 15 the heated blade rises and swings back to the position shown in Fig. 6, while the backing fabric 14 is at rest on the cloth support 1.

Figure 7:
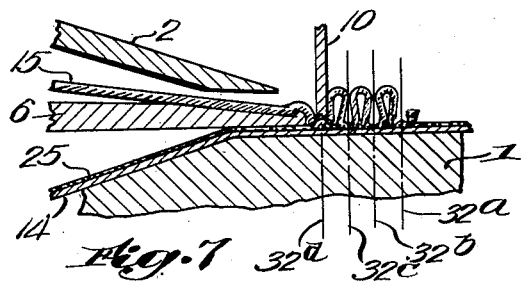

The heated blade then descends, Fig. 7, and presses the soft-surface material along line 32d against the adhesive on the backing fabric and renders it tacky and soft (if not initially soft) and the blade presses the surface material into the soft adhesive. The upper gripper 2 rises and releases its grip on the surface material. The heat of the blade then sets the adhesive if it is of the heat-setting type.

Figure 8:
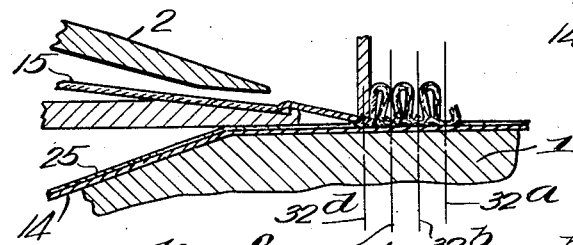

The edge of the heated blade and the fabric are advanced, Fig. 8, a distance equal to that between two successive lines of adhesion by the spike roll 17, Fig. 1, while the blade continues to press upon the soft-surface material. The grippers 2 and 6 are retracted to the position in which they may again seize the soft-surface material 15, thus completing the cycle.

The distance the grippers move forward from their retracted position, Fig. 5, to their advanced position, Fig. 6, is substantially equal to the difference between the length of the curve of the material between two successive lines of adhesion and the width of the space between the two lines. As this difference is a function of the height of the loop of the material, this height is determined by the amount the grippers move forward. The extreme breadth of the loop, i. e., the length between two successive lines of adhesion, is equal to the distance the backing fabric is drawn forward by the spike roll 17.

Figure 9:
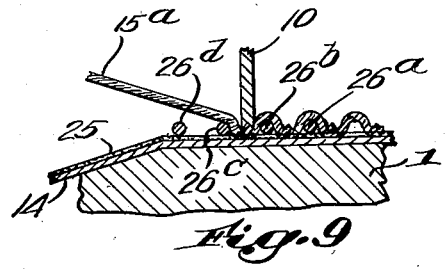
Figs. 9 and 10 are diagrammatic side views, in cross-section, of a cycle of a second form of the process.
Figure 10:
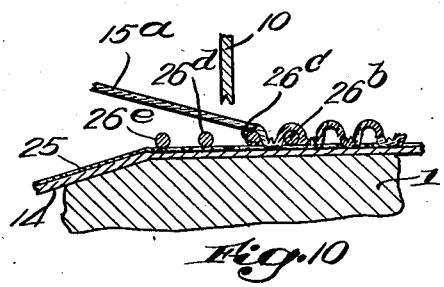

A second form of the process is shown in Figs. 9 and 10. The backing sheet 14, Fig. 9, with its coat of adhesive 25 rests on support 1. A sheet of pile yarns 15a leads directly from pile yarn guide 16, Fig. 1, over wire 26c and down under the edge of the heated blade 10 which presses the yarns against and into the adhesive midway between wires 26b and 26c. The wires 26a, 26b, 26c and 26d have been inserted and are later withdrawn according to the conventional velvet or Wilton wire motion.

In Fig. 10 the heated blade has risen vertically clear of the pile yarns and the entire fabric and the inserted wires have been drawn forward over support 1 a distance equal to that between the axes of two successive wires by spike roll 17, Fig. 1.

Wire 26a, shown in Fig. 9, has been withdrawn and another wire 26e has been inserted behind wire 26d a distance equal to that between two successive lines of adhesion. The heated blade is about to descend to press the yarns against and into the adhesive on the line between wires 26c and 26d.

In this form of my process a cut or an uncut pile fabric may be produced depending on whether the wires are equipped with the usual knives or not.

Figure 11:
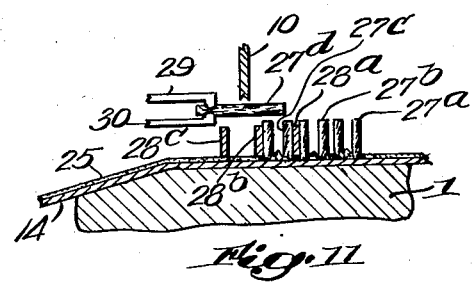
Figs. 11, 12 and 13 are diagrammatic side views in cross-section of a cycle of a third form of the process.
Figure 12:
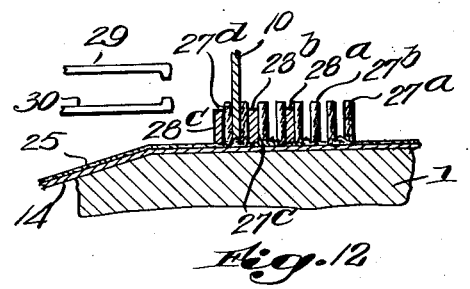
Figure 13:
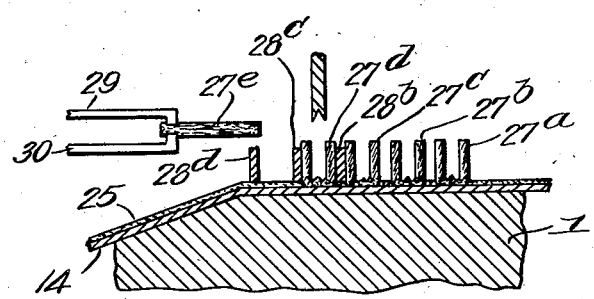
Figure 14:
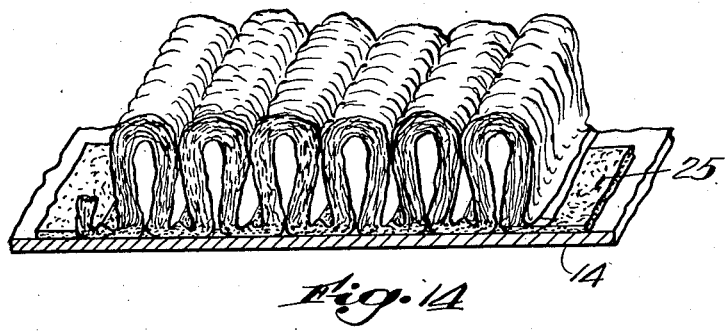
Fig. 14 is a perspective view partly in cross-section of the completed floor covering.

Another form of my process is illustrated in Figs. 11, 12 and 13. In Fig. 11 equal cut lengths of pile yarn have been formed into U-shaped tufts 27a, 27b, and 27c, by previous steps in the cycle and other cut tuft lengths 27d are in position to be applied to the adhesive coating on the backing fabric at rest on cloth support 1. Guide wires 28a, 28b, and 28c have been inserted, as by the conventional wire motion, to aid in the formation of the tufts. Axminster nippers 29 and 30, which operate in a manner well known to the art, for example as described in U. S. Patent No. 1,709,572 or U. S. Patent No. 2,076,785, have fed cut tuft lengths 27d underneath the edge of the blade 10 and over the space between guide wires 28b and 28c. Blade 10 is in position to contact with lengths 27d at their midpoints so that the legs of the U-shaped tufts may be equal.

The heated blade 10 descends, Fig. 12, to form U-shaped tufts which are firmly secured at their lowest central points between adjacent guide wires by the adhesive to the backing sheet. As the blade starts to carry lengths 27d down, nippers 29 and 30 release their grip on said lengths and are retracted to seize new lengths of pile yarn.

In Fig. 13 guide wire 28a, Fig. 11, has been withdrawn and another guide wire 28d has been inserted behind guide wire 28c a distance equal to that between two successive lines of adhesion. Nippers 29 and 30 have seized new lengths 27e of pile yarn. Blade 10 has been raised and backing fabric 14 is still at rest on support 1.

Following the above step and to complete the cycle, the backing sheet with the attached U-shaped tufts and the guide wires is drawn forward over the support by the spike roll 17, Fig. 1, a distance equal to that between the midpoints of two successive guide wires to the position shown in Fig. 11.

Although the processes above described are employed to produce fabrics with rows of loops or tufts running at right angles to the longitudinal direction of the fabric, it will be understood that by proper modification and location of related parts of the mechanism and of the materials the loops or tufts may be applied so that the rows may lie across the fabric at any desired angle. Likewise it will be understood that in the processes hereinbefore described more than one blade may be used by proper modification and location of related parts of the mechanism and materials.

Also, it will be readily seen that the heat may be supplied in ways other than that hereinbefore illustrated and described.

The above drawings and description are given for the sake of clarity and illustrative purposes and not in a limiting sense. Further modifications may be made, all of which are comprehended within the scope of the appended claims.

The apparatus disclosed herein is claimed in the applicant's copending application, Serial No. 326,710, filed December 18, 1952.

The present application is a continuation-in-part of my prior application Serial No. 202,859 filed on December 27, 1950, now abandoned, which is a division of my prior application Serial No. 663,592, now abandoned, filed jointly with Charles R. Johnson on April 19, 1946.

Having described my invention, I claim:

1. The method of making batt-covered sheet material which comprises corrugating a grained batt of fibrous material to form corrugations therein extending crosswise of the grain thereof, depositing the corrugated batt on the thermoplastic-coated face of a fibrous sheet, pressing the troughs of the corrugations against the coating on the sheet, locally heating the pressed troughs to soften the thermoplastic material and embed the troughs therein, and allowing the thermoplastic material to cool for retaining the embedded trough thereby fixedly connecting the batt to the fibrous material and forming a ribbed batt surface on the fibrous material.

2. The method of making batt-covered sheets which comprises advancing a thermoplastic-coated sheet on a support, corrugating a resilient batt of fibrous material to form corrugations extending crosswise of the sheet, depositing the corrugated batt on the coated face of the sheet, pressing the troughs of the corrugations against the coating on the sheet, and locally heating the pressed troughs of the corrugations to soften the thermoplastic coating and embed some of the fibrous material of the batt therein.

3. The method, adapted to produce a floor covering having a soft-surface material securely adhered in transverse lines or rows to a backing sheet by a thermoresponsive adhesive, which comprises advancing a predetermined length of soft-surface material, depressing a portion of said length of said material to form a bight and to apply the bottom of said bight directly to and press it against an adhesive on the surface of a backing sheet, simultaneously locally applying heat to the adhesive between the bottom of said bight and said backing sheet as said bight is in contact with said adhesive, discontinuing the application of said heat, and advancing said backing sheet with the affixed material.

4. The method, adapted to produce a floor covering having a soft-surface material securely adhered in transverse lines or rows to a backing sheet by a thermoresponsive adhesive, which comprises feeding longitudinally a length of said backing sheet, advancing a predetermined length of soft-surface material, depressing a portion of said length of said material to form a bight and to apply the bottom of said bight directly to and to press it against and into a thermoresponsive adhesive on the surface of the backing sheet, applying heat locally to the adhesive between the bottom of said bight and said backing sheet as the adhesive receives the bottom of said bight, discontinuing the application of said heat, and advancing said backing sheet with the affixed soft-surface material a distance equal to said length of said backing sheet.

5. A non-woven pile fabric resembling in the appearance of its pile face a woven carpet or rug, comprising a flexible backing sheet, a soft-surface material adhesively secured to said backing sheet along uniformly spaced lines by ridges of adhesive in which said soft-surface material is embedded, said soft-surface material between said ridges forming upstanding pile-like rows.

6. The non-woven pile fabric of claim 5 in which the adhesive comprises a polyvinyl resin.

7. The method, adapted to produce a floor covering having a soft-surface material securely adhered in transverse lines or rows to a backing sheet by a thermoresponsive adhesive, which comprises advancing a predetermined length of soft-surface material, depressing a portion of said length of said material, pressing the bottom of said depressed portion against and into a thermoresponsive adhesive on the surface of a backing sheet, simultaneously applying heat to the adhesive between the bottom of said depressed portion and said backing sheet to soften the adhesive to receive the bottom of said depressed portion, forming the adhesive in which the bottom of the depressed portion is received into a ridge, discontinuing the application of said heat to cause said adhesive to cool and set, and advancing said backing sheet with the affixed material.

8. A floor covering having a soft-surface material securely adhered in transverse rows to a backing sheet by an adhesive material on said backing sheet, said rows presenting a U-shaped bottom embedded along closely adjacent parallel lines in said adhesive on the surface of the backing sheet with a thicker mass of adhesive between said lines than at said lines.

9. A floor covering having a soft-surface material securely adhered in transverse upstanding rows to a backing sheet by a thermoresponsive adhesive and presenting a bottom of U-shape embedded along two closely adjacent parallel lines in said adhesive on the surface of said backing layer with a thicker mass of adhesive therebetween than at said lines.

10. The method of making a floor covering having a soft-surface material securely adhered in transverse lines or rows to a backing sheet by an adhesive which comprises advancing a predetermined length of soft-surface material longitudinally of and spaced from an adhesive coated backing sheet, pressing said soft-surface material along a line extending transversely of said backing sheet to form a bight in said length of said material and to apply said bight directly to and press it against a thermoresponsive adhesive on the surface of a backing sheet, adhering said bight to said backing sheet by activating the adhesive while so pressed by locally changing the temperature thereof, and advancing said backing sheet with the adhered soft-surface material.

11. The method of making a floor covering having a soft-surface material securely adhered in transverse lines or rows to a backing sheet by an adhesive which comprises advancing a continuous length of soft-surface material a predetermined distance longitudinally of and spaced from an adhesive coated backing sheet, pressing said soft-surface material along a line extending transversely of said backing sheet to form a bight in said length of said material and to apply said bight directly to and press it against a thermoresponsive adhesive on the surface of a backing sheet, adhering said bight to said backing sheet by activating the adhesive while so pressed by locally changing the temperature thereof, and advancing said backing sheet with the adhered soft-surface material.

12. The method of making a floor covering having a soft-surface material securely adhered in transverse lines or rows to a backing sheet by an adhesive which comprises advancing a predetermined cut length of soft-surface material, forming a bight in said cut length of said material and pressing the bight against a thermoresponsive adhesive on the surface of a backing sheet, adhering said bight to said backing sheet by activating the adhesive by changing the temperature thereof, and advancing said backing sheet with the adhered soft-surface material.

13. The method of making a floor covering having a soft-surface material securely adhered in transverse lines or rows to a backing sheet by an adhesive which comprises intermittently advancing a predetermined length of soft-surface material, forming a bight in said length of said material, pressing the bight against a thermoplastic adhesive on the surface of a backing sheet, simultaneously applying heat to said adhesive to soften it, discontinuing said application of heat, thereby adhering said bight to said backing sheet by said adhesive, and advancing said backing sheet with the adhered soft-surface material.

14. The method of making a floor covering having a soft-surface material securely adhered in lines or rows to a backing sheet by an adhesive which comprises advancing a length of soft-surface material a predetermined amount longitudinally of and spaced from an adhesive coated backing sheet, pressing said soft-surface material along a line extending transversely of said backing sheet to form a bight in said length of said material and to apply said bight directly to and press it against the adhesive on the surface of the backing sheet, adhering said bight to said backing sheet while so pressed by locally setting said adhesive, and advancing said backing sheet with the adhered soft-surface material.

15. The method of making a floor covering having a soft-surface material securely adhered in lines or rows to a backing sheet by an adhesive which comprises advancing a length of soft-surface material a predetermined amount longitudinally of and spaced from an adhesive coated backing sheet, pressing said soft-surface material along a line extending transversely of said backing sheet to form a bight in said length of said material and to apply said bight directly to and press it against a thermoresponsive adhesive on the surface of a backing sheet, adhering said bight to said backing sheet by activating the adhesive while so pressed by locally changing the temperature thereof, and advancing said backing sheet with the adhered soft-surface material.

16. The method of making a floor covering having a soft-surface material securely adhered in lines or rows to a backing sheet by a thermoresponsive adhesive which comprises forming successive and independent rows of cut pieces of soft-surface material, thereafter forming a bight in each of said rows of said material and pressing the bights of each successive row against a thermoresponsive adhesive on the surface of a flexible backing sheet, with each row spaced at a distance from a previously applied row, adhering said bights to said backing sheet by activating the adhesive by changing the temperature thereof, and advancing said backing sheet with the adhered soft-surface material.

HENRY A. REINHARDT.

References Cited in the file of this patent

UNITED STATES PATENTS

| Number | Name | Date |
|---|---|---|
| 1,914,962 | Smith | June 20, 1933 |
| 2,033,325 | Clapp | Mar. 10, 1936 |
| 2,116,048 | Smith | May 3, 1938 |
| 2,160,154 | Kellogg et al. | May 30, 1939 |
| 2,312,129 | Smith | Feb. 23, 1943 |
| 2,352,131 | Smith | June 20, 1944 |
| 2,515,847 | Winkler | July 18, 1950 |